United States Patent
Kelty

(10) Patent No.: US 7,052,612 B2
(45) Date of Patent: May 30, 2006

(54) SKIMMER AND FILTER

(76) Inventor: Charles F. Kelty, 4B Water Garden Way, Santa Fe, NM (US) 87508

(*) Notice: Subject to any disclaimer, the term of this patent is extended or adjusted under 35 U.S.C. 154(b) by 34 days.

(21) Appl. No.: 10/748,973

(22) Filed: Dec. 29, 2003

(65) Prior Publication Data

US 2004/0182766 A1 Sep. 23, 2004

Related U.S. Application Data

(60) Provisional application No. 60/436,758, filed on Dec. 27, 2002.

(51) Int. Cl.
 *C02F 1/32* (2006.01)
 *E04H 4/12* (2006.01)
 *B01D 29/25* (2006.01)

(52) U.S. Cl. .................... 210/744; 210/748; 210/776; 210/169; 210/416.2; 210/448

(58) Field of Classification Search .............. 210/97, 210/169, 170, 416.1, 416.2, 448, 452, 748, 210/744, 776
See application file for complete search history.

(56) References Cited

U.S. PATENT DOCUMENTS

| | | | | |
|---|---|---|---|---|
| 1,762,314 A | * | 6/1930 | Sutphen et al. ............ 210/752 |
| 2,103,316 A | | 12/1937 | Boosey | |
| 2,282,225 A | * | 5/1942 | Hawley et al. ............ 210/629 |
| 3,059,243 A | * | 10/1962 | Ross et al. ................. 4/512 |
| 3,661,262 A | * | 5/1972 | Sanders ..................... 210/169 |
| 3,677,408 A | | 7/1972 | Dinizo, Jr. | |
| 4,021,347 A | * | 5/1977 | Teller et al. ............ 210/195.1 |
| 4,022,690 A | * | 5/1977 | Smith ....................... 210/169 |
| 4,139,471 A | | 2/1979 | Foti | |
| 4,246,113 A | | 1/1981 | Mausgrover | |
| 4,454,035 A | * | 6/1984 | Stefan ....................... 210/117 |
| 4,752,401 A | * | 6/1988 | Bodenstein ................. 210/746 |
| 5,256,299 A | * | 10/1993 | Wang et al. ................. 210/664 |
| 5,285,538 A | * | 2/1994 | Hodak ......................... 4/507 |
| 5,780,860 A | * | 7/1998 | Gadgil et al. ............ 250/432 R |
| 5,785,845 A | * | 7/1998 | Colaiano .................... 210/167 |
| 6,322,694 B1 | * | 11/2001 | Iliadis et al. ................ 210/167 |
| 6,461,501 B1 | | 10/2002 | Porter | |
| 2003/0094422 A1 | * | 5/2003 | Perkins et al. ............. 210/764 |
| 2004/0094470 A1 | * | 5/2004 | Jackson ..................... 210/411 |

FOREIGN PATENT DOCUMENTS

| | | | |
|---|---|---|---|
| DE | 29816019 | * | 1/2000 |
| GB | 2353231 | * | 2/2001 |

* cited by examiner

*Primary Examiner*—Fred G. Prince
(74) *Attorney, Agent, or Firm*—Vidal A. Oaxaca; Peacock Myers, P.C.

(57) ABSTRACT

A skimmer and filter unit for use with a body of water. A tank portion of the unit defines an interior skimmer chamber, one or more ultraviolet light chambers, filter chamber, and pump chamber. Water is received through a pivoting weir door of a skimmer faceplate assembly affixed to the tank portion. Water is directed downward from the weir opening to a skimmer basket, then through unidirectional ports defined in a lower portion of a partitioning wall to one or more ultraviolet light chambers where it is subjected to ultraviolet light. After being subjected to ultraviolet light, the water is passed through a filter chamber then to a pump chamber where it is pumped away from the skimmer and filter unit. An interlocking lid is secured to the tank portion to seal the interior of the tank portion and protect the tank from deformation caused by the surrounding environment.

28 Claims, 18 Drawing Sheets ns particularly pointed out in the appended claims.

SKIMMER AND FILTER

CROSS-REFERENCE TO RELATED APPLICATIONS

This application is related to U.S. Provisional Patent Application Ser. No. 60/436,758 entitled, "Method and Apparatus for Pond Skimmer and Filter," filed on Dec. 27, 2002, and claims the benefit of the filing date thereof. The entire specification of the priority application is incorporated herein by reference.

BACKGROUND

1. Technical Field

The present invention relates generally to the field of water treatment devices for the removal of debris from bodies of water, in particular, the invention relates to the field of filters, skimmers, and water treatment devices for ornamental bodies of water, such as pools, ponds, waterfalls and streams.

2. Background

Skimmers and filters are often used in conjunction to clean and treat decorative bodies of water for landscaping, such as ponds and waterfalls. In general skimmers skim debris from the surface of the water and filters remove smaller debris from the entire depth of the water. Skimmers typically filter larger debris from the water surface with a coarse net or basket, while filters incorporate filter media, which can be a variety of materials including but not limited to mats, rocks, and nylon mesh, all of which have limited capacity for water treatment. Often one or more pumps are used to draw the water to the mouth of the skimmer or filter. Once the water has been skimmed or filtered, it is returned from the skimmer or filter to the body of water.

Skimmers and filters are usually installed external to the body of water but in proximity to it. For example, many skimmers and filters are installed in the ground adjacent the body of water. These devices are cumbersome and require careful installation to eliminate or reduce water loss during the transfer of water between the body of water and the water treatment device. Another difficulty with filters, skimmers, and water treatment devices generally, is that the mouth, or weir, size is fixed, requiring the user to select a skimmer or filter of a particular size for a given application. Yet another difficulty with skimmers and filters is their inadequacy in reducing or eliminating living organisms, such as single-celled algae, protozoa, and bacteria.

An improved skimmer and filter device is needed that could be easily and efficiently installed, and provide superior water treatment.

SUMMARY

The skimmer and filter unit of the present invention is for use with a body of water. A tank portion of the unit defines an interior having a skimmer chamber, ultraviolet light chamber, filter chamber, and pump chamber. In addition to skimming and filtration, water received into the unit is subjected to ultraviolet light within the ultraviolet light chamber.

Objects, advantages and novel features, and further scope of applicability of the skimmer and filter will be set forth in part in the detailed description to follow, taken in conjunction with the accompanying drawings, and in part will become apparent to those skilled in the art upon examination of the following, or may be learned by practice. The objects and advantages of the skimmer and filter may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate an embodiment of the skimmer and filter and, together with the description, serve to explain the principles of the skimmer and filter apparatus and method of operation. The drawings are not to be construed as limiting the skimmer and filter.

DESCRIPTION OF THE PREFERRED EMBODIMENTS

The skimmer and filter unit of the present invention is depicted with two configurations of the various chambers; however, it will be understood by those of skill in the art that these and other configurations of the skimmer and filter chambers are possible via the inventive principles.

Figure 1:
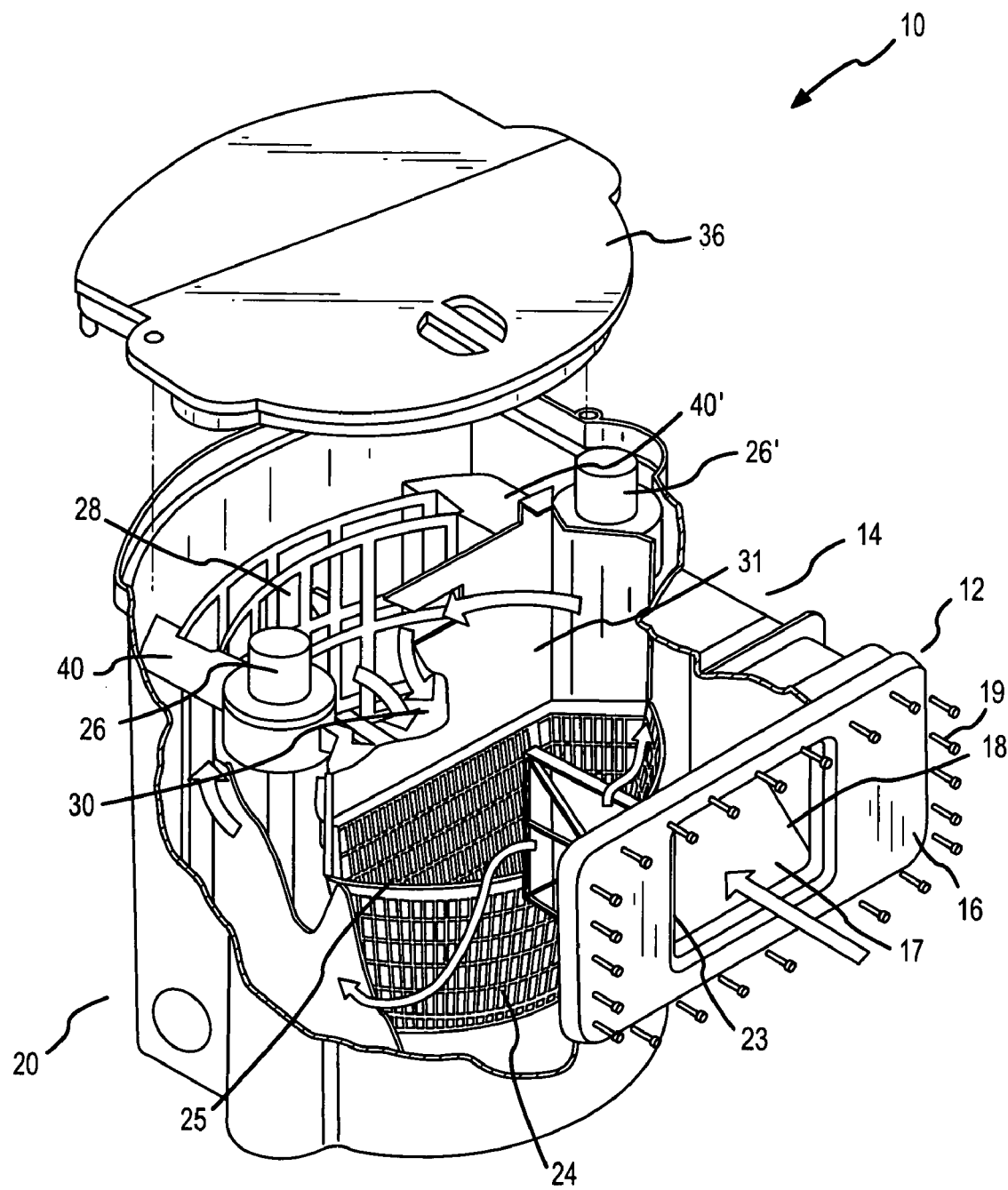
FIG. 1 is a perspective, cutaway, exploded view of the skimmer and filter with a centrally located pump chamber removed, two ultraviolet light chambers and a single filter cartridge in the filter chamber.

Referring to FIG. 1, a perspective, cutaway, exploded view of skimmer and filter unit 10 is shown. Unit 10 includes a generally upright cylindrical tank portion 20 and interlocking lid 36. Unit 10 is in fluid communication with a body of water via a mechanically sealed skimmer faceplate assembly 12 and elongated neck 14. Neck 14 extends outward from a wall of tank portion 20, the distal end of which is skimmer faceplate assembly 12. Skimmer faceplate assembly 12 provides a watertight connection to concrete, flexible membrane, or clay-lined bodies of water. Weir opening 17 defined in weir faceplate 16 receives water from a body of water. Neck 14 accommodates a plurality of interchangeable weir faceplates 16, each of which define an opening 17 of a different size. The selection of a weir faceplate 16 allows for the adjustment of the effective neck width, or weir width, to compensate for variable water flow rates. Weir faceplate 16 is sealed to neck 14 with a series of fastening means 19, such as but not limited to screws, or nuts and bolts. Weir dividers 23 slide into mating slots of neck 14 to form the appropriate-sized fluid conduit that coincides with the dimensions of opening 17 of weir faceplate 16.

Within unit 10 are skimmer chamber 24, filtration chamber 28, one or more ultraviolet (UV) light chambers 26, and pump chamber 30, defined by the interior of tank portion 20, for the removal of debris, various suspended and dissolved organic wastes, and living organisms, such as single-celled algae, protozoa, and bacteria. Tank portion 20 contains removable, semi-rigid skimmer basket 25 within skimmer chamber 24 to collect floating debris from the water after the water has passed through and over a pivoting and buoyant weir door 18 (see also FIG. 4). One or more UV light chambers 26 are positioned downstream of skimmer chamber 24.

Water flow, indicated with arrows, enters tank 20 through opening 17 over weir door 18, downward through skimmer chamber 24, then through one or more unidirectional ports located at the lower periphery of tank 20 through partitioning wall 31 to UV light chambers 26, which subject the water to high-intensity UV light for purification and eradication of contaminants such as single-celled algae. After passing through UV light chambers 26, the water continues through ports to filter chamber 28 for the mechanical removal of suspended solids and biological treatment for the removal of dissolved organic compounds. Filter chamber 28 can perform this function with one or more cartridge-based bio-mechanical filter mats, or other suitable filtration means. After being drawn through filter chamber 28, centrally located pump chamber 30 (pump not shown) pumps the water away from unit 10 back to the body of water.

Figure 2:
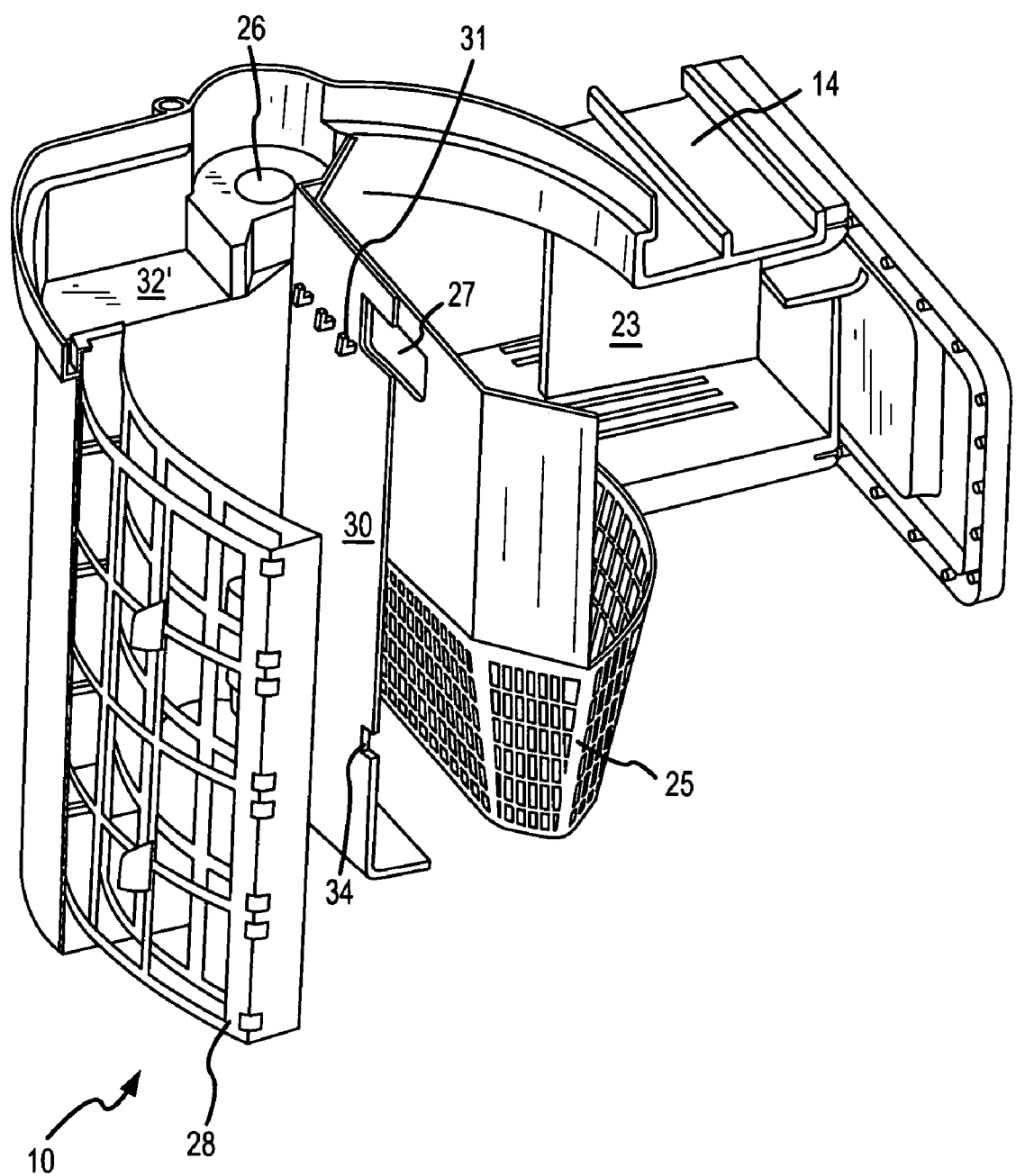
FIG. 2 is a perspective, cutaway view of the skimmer and filter of FIG. 1 showing the partitioning walls.

Turning to FIG. 2, a perspective, cutaway view of skimmer and filter unit 10 of FIG. 1 reveals the partitioning walls between the chambers. Partitioning walls 32 separate UV light chambers 26 and filter chamber 28. Partitioning wall 31 separates skimmer chamber 24 from pump chamber 30, filter chamber 28, and UV chambers 26.

Figure 3:
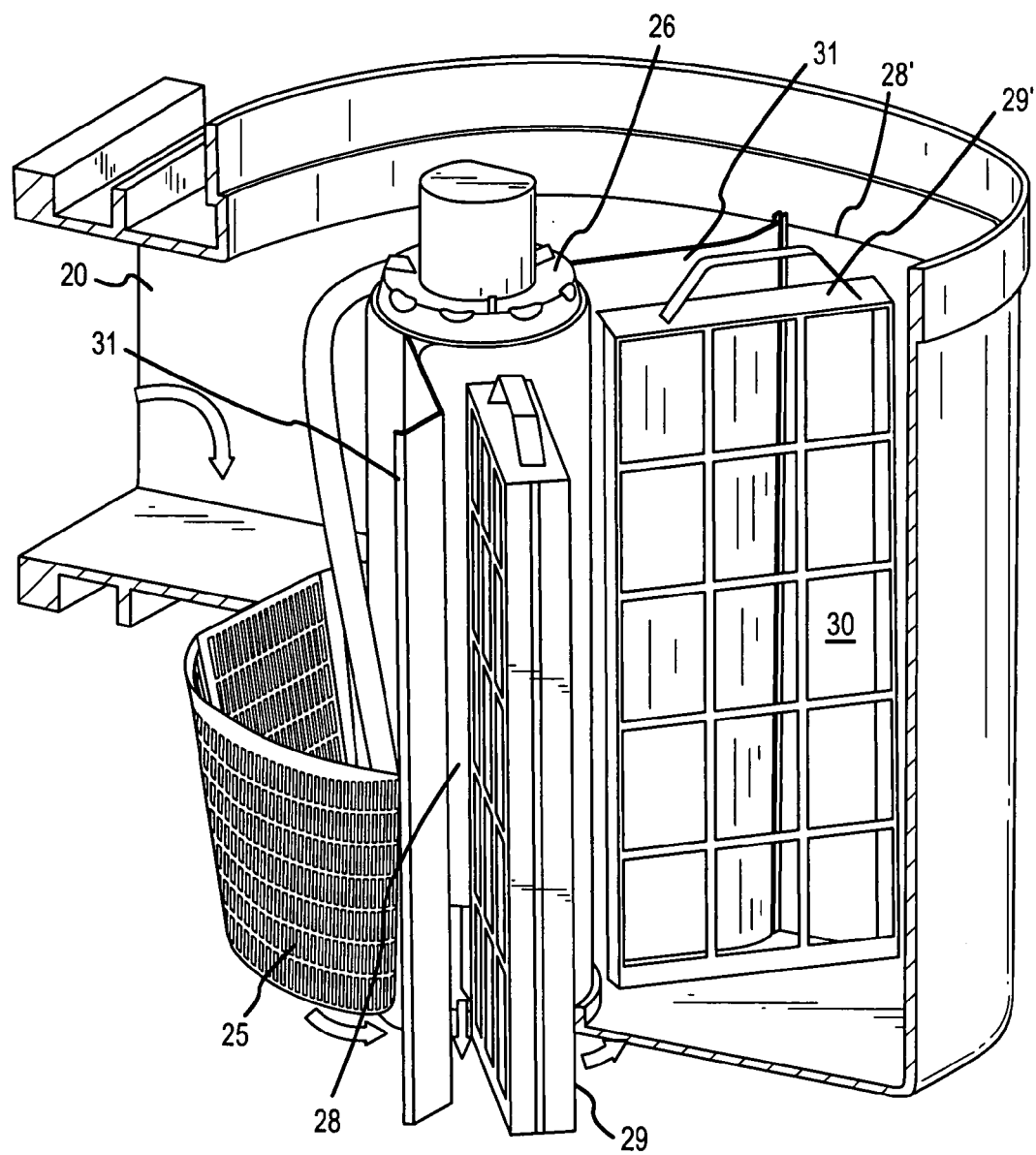
FIG. 3 is a perspective, cutaway view of the skimmer and filter showing application of a single centrally located ultraviolet light chamber, two filter cartridges and a rear pump chamber.
Figure 4:
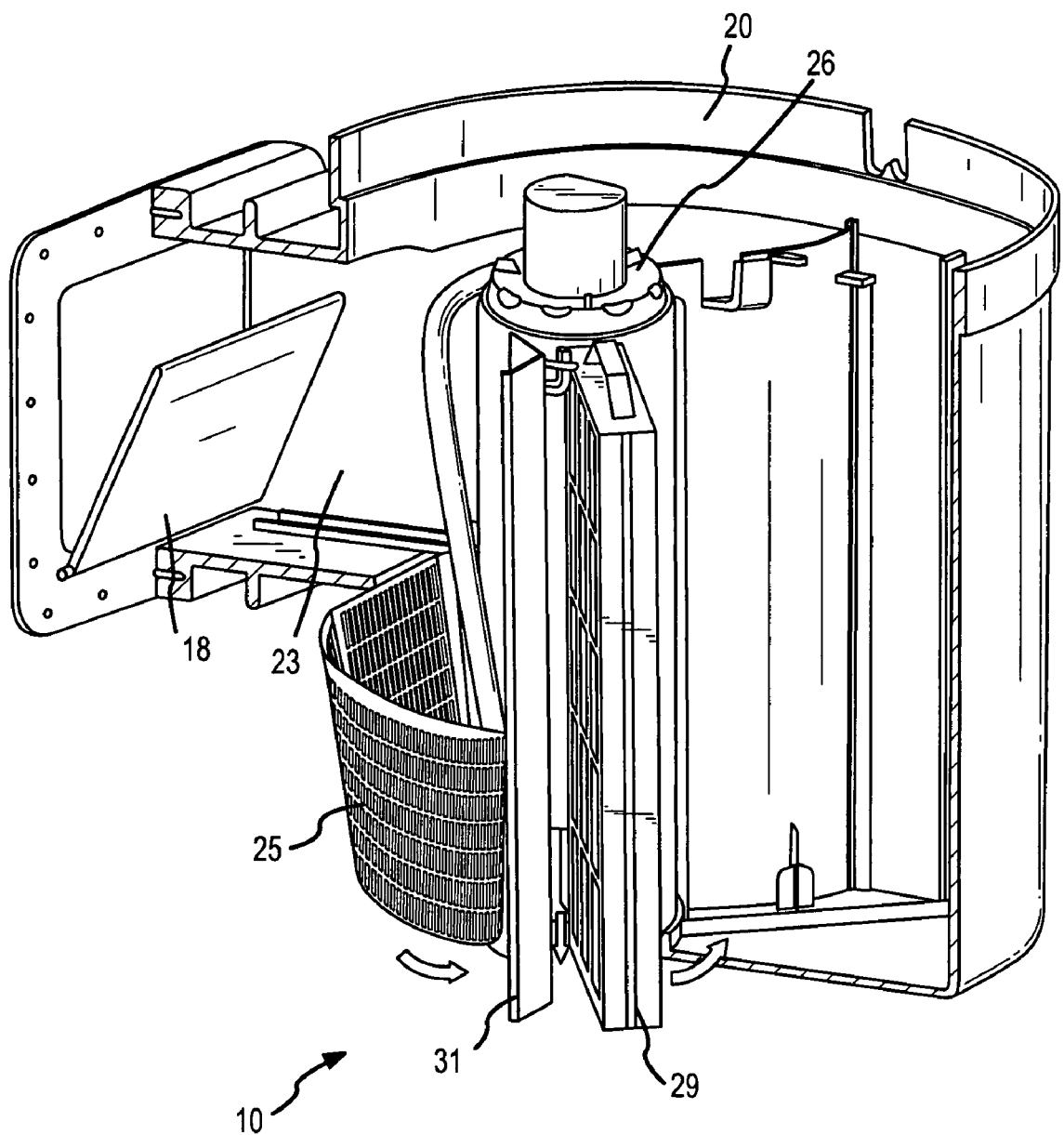
FIG. 4 is a perspective, cutaway view of the skimmer and filter of FIG. 3 showing the weir door and a weir divider from the interior.

Referring to FIG. 3, a perspective, cutaway view of skimmer and filter unit 10 shows application of a single central UV chamber 26, two filter cartridges 29, 29' and a rear pump chamber 30 (pump not shown). Pump chamber 30 houses submersible water pumps of various sizes and accommodates fittings for attachment to an external pumping apparatus or drain fitting. Pump chamber 30 is vertically-accessible for efficient removal of the pumping apparatus without disturbance of the bio-mechanical filter media of filter chamber 28 or other filtration components. FIG. 4 is a perspective, cutaway view of skimmer and filter unit 10 of FIG. 3 showing weir door 18 and a weir divider 23 from the interior.

Figure 5:
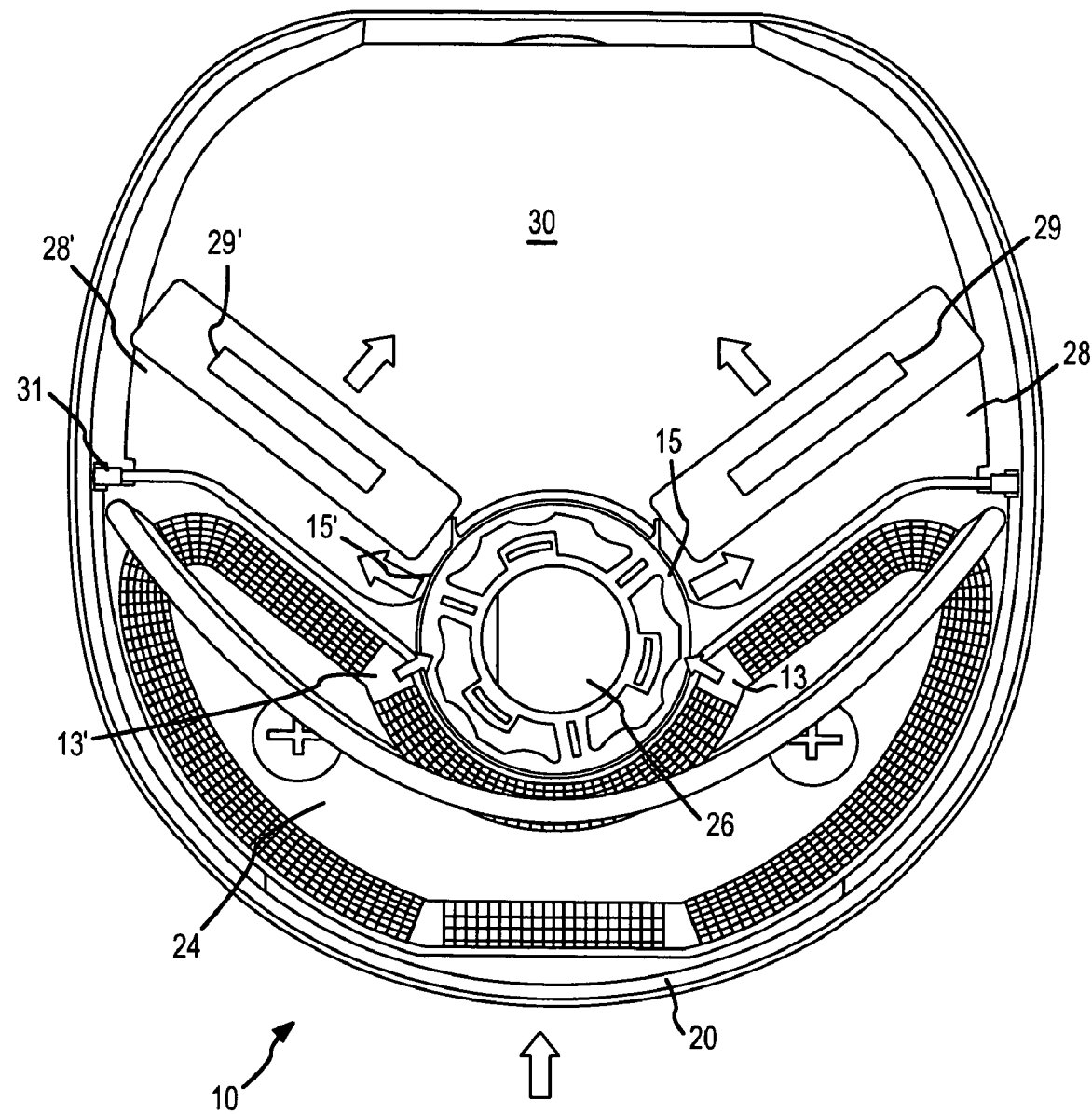
FIG. 5 is a top interior view of the skimmer and filter of FIGS. 3 and 4 with the neck portion removed.

FIG. 5 provides a top view of skimmer and filter unit 10 of FIGS. 3 and 4 with neck 14 removed. Water enters over the weir door and travels downward through skimmer basket of skimmer chamber 24. After passing through the skimmer basket, the water travels through unidirectional ports 13, 13', located in a lower portion of wall 31 near the bottom of tank 20, into central UV chamber 26. Water then travels from UV chamber 26 out of unidirectional ports 15, 15' to filter chamber 28 where it passes through filter cartridges 29, 29'. After passing through filter cartridges 29, 29' the water is pulled into pump chamber 30 where it is expelled back to the body of water by the pumping apparatus.

Figure 6:
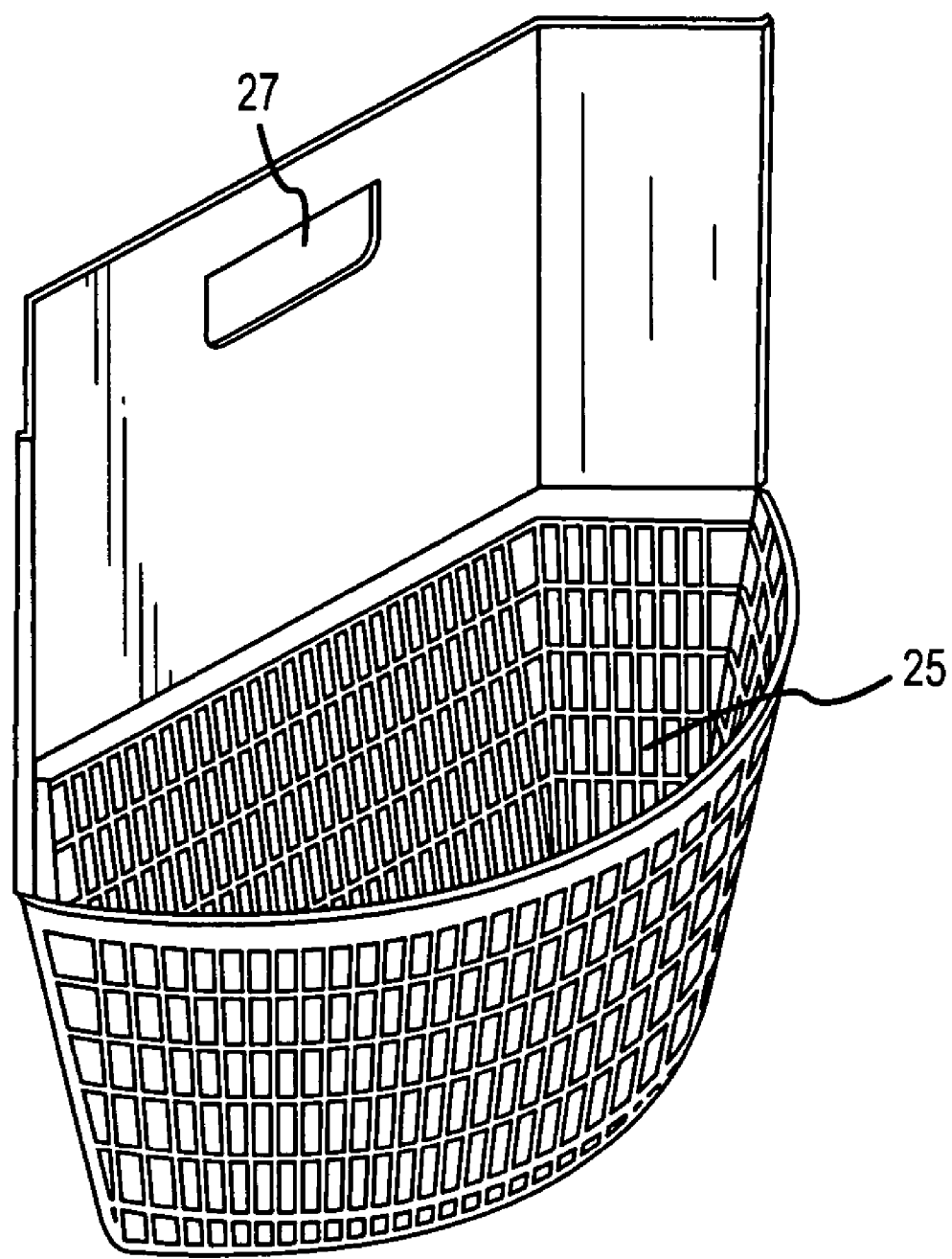
FIG. 6 is a perspective view of the skimmer basket of the skimmer chamber.

Turning to FIG. 6, a perspective view of skimmer basket 25 of skimmer chamber 24 is shown. Skimmer basket 25 is removable by way of reaching into the interior of tank 20 and grasping handle 27 affixed to basket 25 by an extended planar panel that places handle 27 conveniently within reach after removal of lid 36. (See also FIG. 2.) In this manner, skimmer basket 25 is readily removed, cleaned, and/or replaced from tank 20 as needed.

Figure 7:
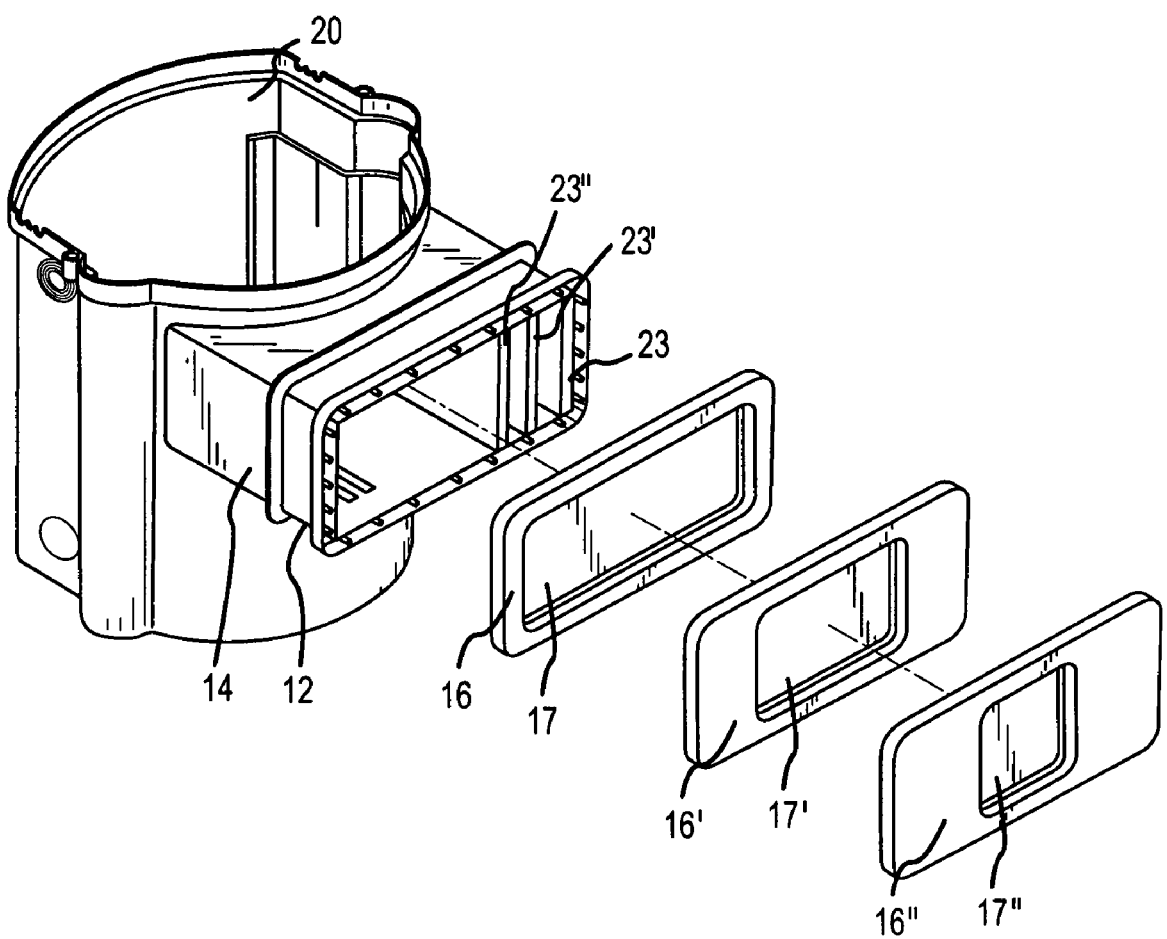
FIG. 7 is a perspective view of the skimmer and filter tank and a plurality of interchangeable weir faceplates.

Referring to FIG. 7, a perspective view of tank 20 of skimmer and filter unit 10 and a plurality of interchangeable weir faceplates 16 is shown. Each weir faceplate 16 defines an opening 17 of different dimensions to accommodate water flow. A pair of weir dividers 23 are used in conjunction with a particular weir faceplate 16 to guide water through neck 14 into skimmer chamber 24. (See also FIG. 8.) Weir dividers 23, 23', and 23" are shown positioned vertically in the appropriate mating slots of neck 14 behind skimmer faceplate assembly 12 to align with the width of openings 17, 17', and 17" respectively of weir faceplates 16, 16', and 16". For example, weir faceplate 16" defining opening 17" would require weir divider 23" and its opposite weir divider (not shown) to be positioned in the innermost mating slots of neck 14 to align with the width dimension of opening 17".

Figure 8:
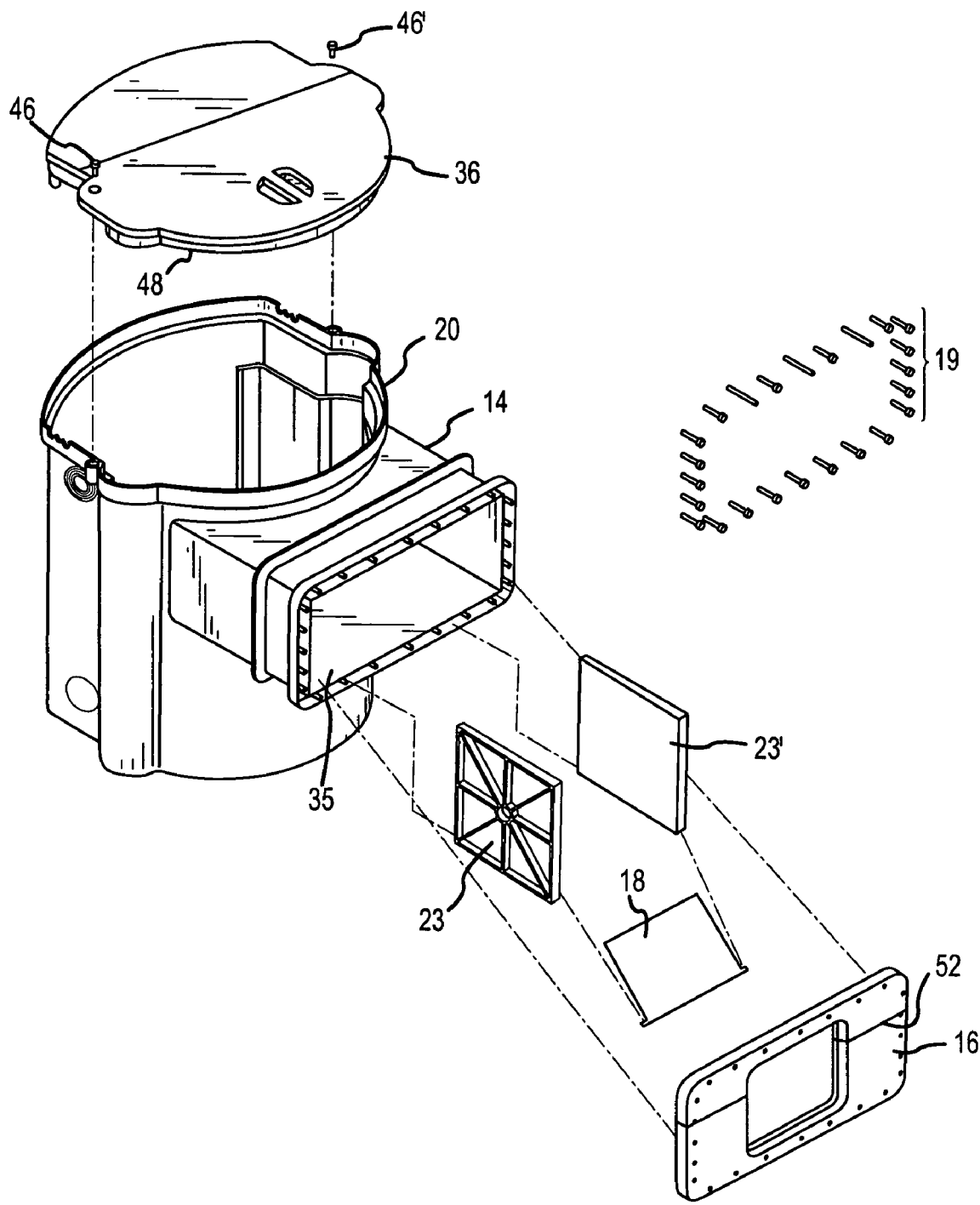
FIG. 8 is a perspective, exploded view of the tank, lid, weir dividers, weir door, and weir faceplate of the skimmer and filter.

FIG. 8 is a perspective, exploded view of tank 20, interlocking lid 36, weir dividers 23, weir door 18, and weir faceplate 16. Weir dividers 23 are frictionally fit into mating slots 35 of neck 14. Weir door 18 is frictionally fit into notches in lower corners of weir dividers 23 via mating hinge tabs at the lower corners of weir door 18, such that weir door 18 pivots in response to water pressure. Weir faceplate 16 is secured to neck 14 with fastening means 19 through mating openings 21 (see FIG. 9) in weir faceplate 16 and neck 14. In the event that the body of water is lined with a flexible membrane, or liner, the liner can be positioned between neck 14 and weir faceplate 16 and an incision made through the liner near the top of skimmer opening 17 to allow water to pass into the skimmer. Preferably, the water level entering weir faceplate 16 is within 0.75 inches above or below water level mark 52 of faceplate 16 for optimal operation.

Figure 9:
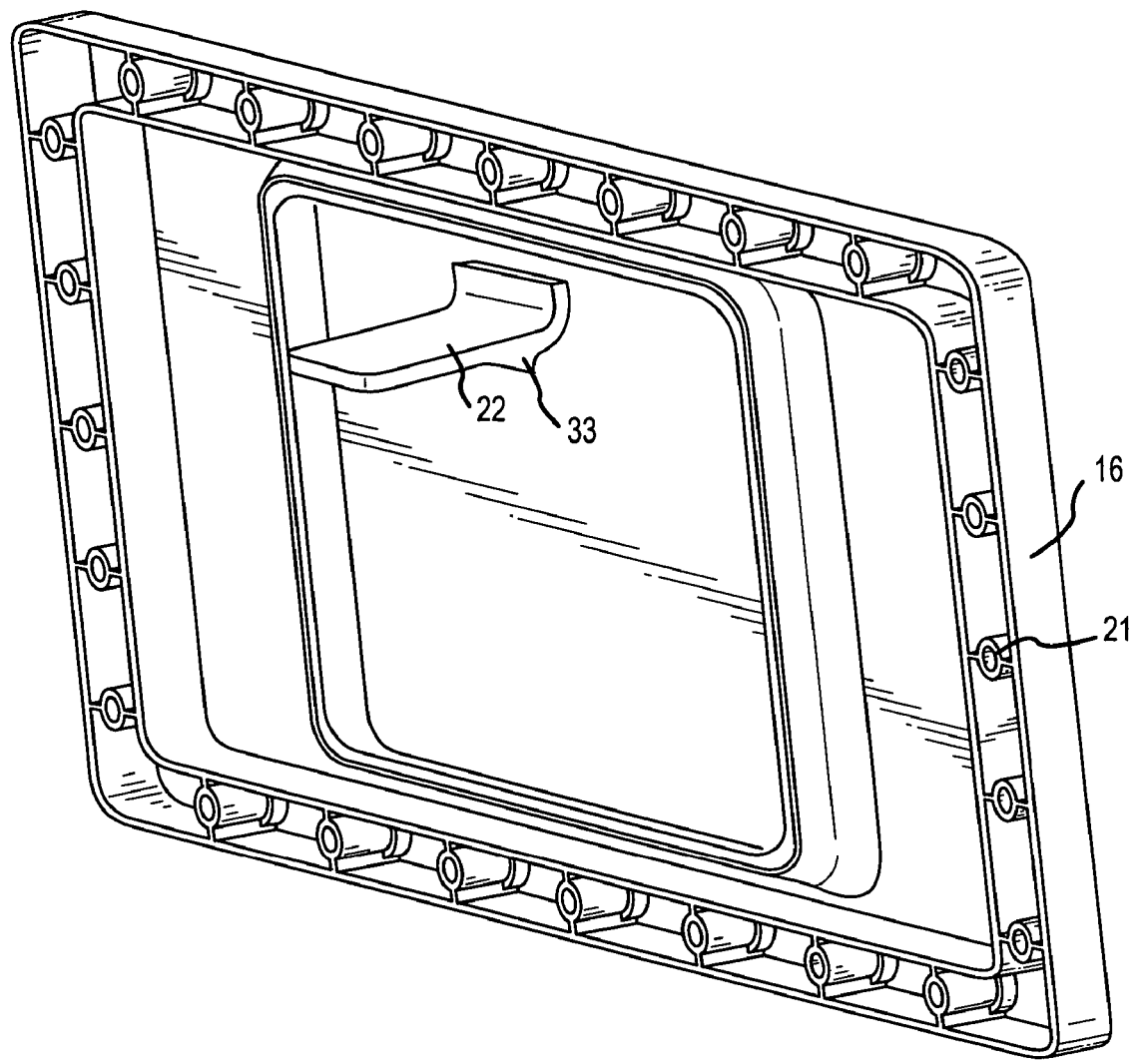
FIG. 9 is a rear perspective view of the weir faceplate.

Referring to FIG. 9, a rear perspective view of weir faceplate 16 is shown. Flexible locking tab 22 is used to secure weir door 18 in a closed position when cleaning or performing maintenance on skimmer and filter unit 10. To lock weir door 18 in a closed position to prevent fluid communication between unit 10 and a body of water, weir door is rotated upward and the top of weir door 18 is secured behind catch 33 of locking tab 22. To release weir door, locking tab 22 is pressed upward and door 18 is released from its position behind catch 33.

Figure 10A:
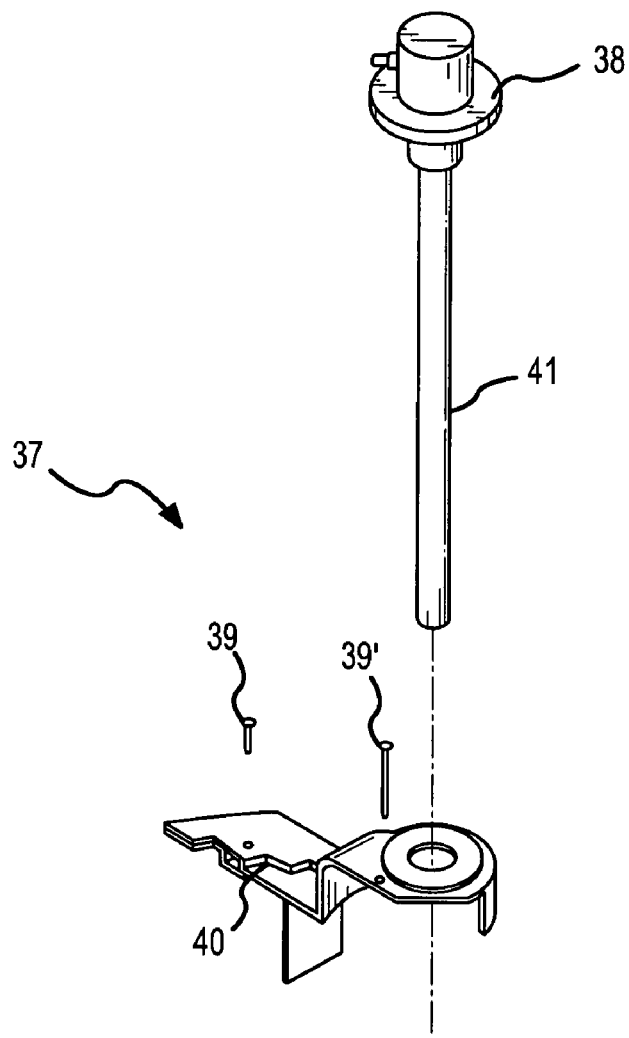
FIG. 10*a* is a perspective exploded view of an ultraviolet light assembly and associated mount.
Figure 10B:
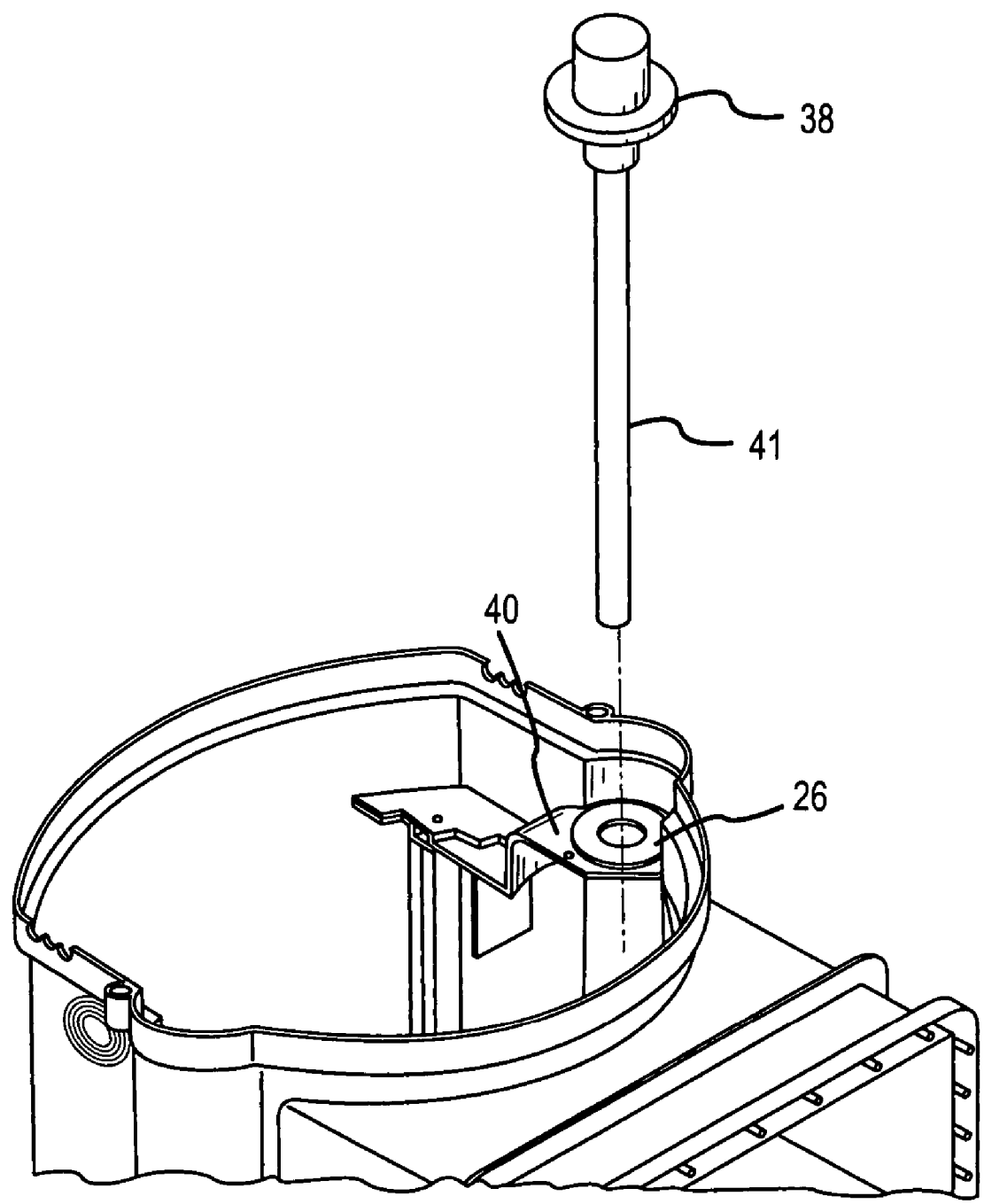
FIG. 10*b* is a perspective exploded view of the ultraviolet light assembly and associated mount of FIG. 10*a* as assembled into the skimmer and filter unit.

In addition to the skimming and filtering features of the skimmer and filter unit 10, UV light is applied to the water for purification. FIGS. 10a and 10b are perspective exploded views of a UV light assembly 37 as assembled into tank 20 of skimmer and filter unit 10. UV mount 40 is affixed to the upper surface of UV chamber 26 defined within tank 20 with UV mount fastening means 39, such as but not limited to screws, or nuts and bolts. UV light 41 that is affixed to locking ring 38 is positioned through UV mount 40 and into UV chamber 26 so that UV light 41 is fully inserted into UV chamber 26. Tabs on locking ring 38 are inserted into mating slots in UV mount 40. Once inserted, locking ring 38 is rotated approximately ¼ of a turn to secure UV light assembly 37 into UV light chamber 26. A power source, such as one or more batteries, or electrical connection to a power outlet is used to power UV lights 41.

Ultraviolet light purifies the water and eradicates contaminants. A baffle block can be used to prevent water flow to an unused UV chamber 26. For example, water bodies less than approximately 5000 gallons may require operation of only one UV chamber for sufficient purification. Table 1 provides examples of UV lighting power and approximate gallons per hour (GPH) of water flow required through the UV light chamber for sufficient water treatment:

TABLE 1

| Number of 25 Watt UV Lights | Number of 37 Watt UV Lights | GPH (min–max) |
| --- | --- | --- |
| 1 | 0 | 500–2500 |
| 0 | 1 | 500–4000 |
| 1 | 0 | 1200–2500 |
| 0 | 1 | 1200–4000 |
| 2 | 0 | 1200–5000 |
| 2 | 0 | 2500–5000 |
| 0 | 2 | 2500–8000 |

When beneficial bacteria is introduced to a body of water, power is preferably removed from the UV light for approximately 24 hours to allow the bacteria to settle.

Figure 11:
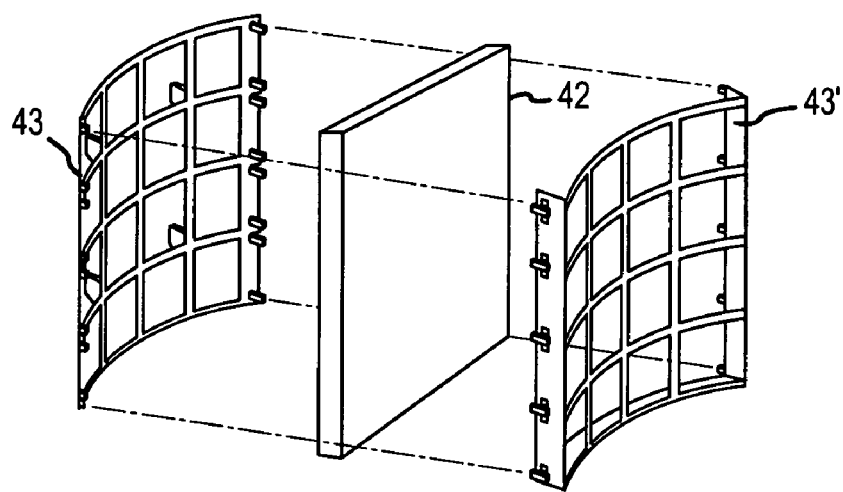
FIG. 11 is a perspective exploded view of filtration media for the filter chamber of the skimmer and filter.

Water is filtered within filter chamber 28 after the water has been treated with UV light in UV chambers 26. FIG. 11 provides a perspective exploded view of filtration media for filter chamber 28. Filtering can be achieved, for example, with a bio-mechanical filter mat 42, or other suitable filtration means, secured within a housing or cartridge 43 that is placed within filter chamber 28.

After the water passes through filter chamber 28, it enters pump chamber 30 where a pump pumps the water away from the skimmer and filter unit 10 back to the body of water. Occasionally, filter mats 42 become clogged with debris, which can prevent a sufficient flow of water to the pump. To prevent this from occurring, float-actuated bypass valve 34 is integrated into partitioning wall 31 (see FIG. 3) between skimmer chamber 24 and pump chamber 30 to monitor the level of water within pump chamber 30 and allow additional water to flow into pump chamber 30 from skimmer chamber 24 should the water level be insufficient.

Figure 12A:
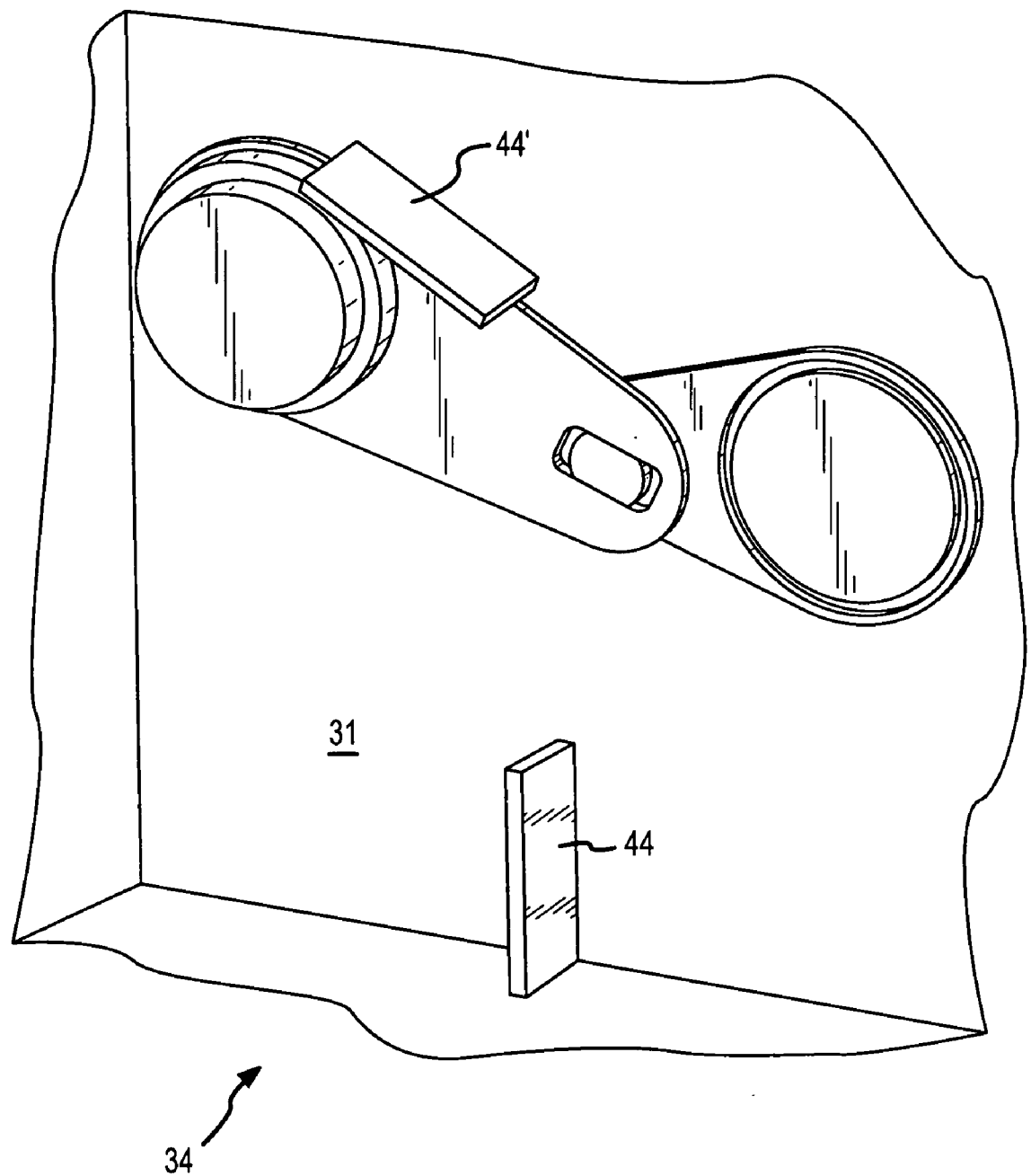
FIG. 12*a* is a perspective view of the flow bypass valve in the closed position.
Figure 12B:
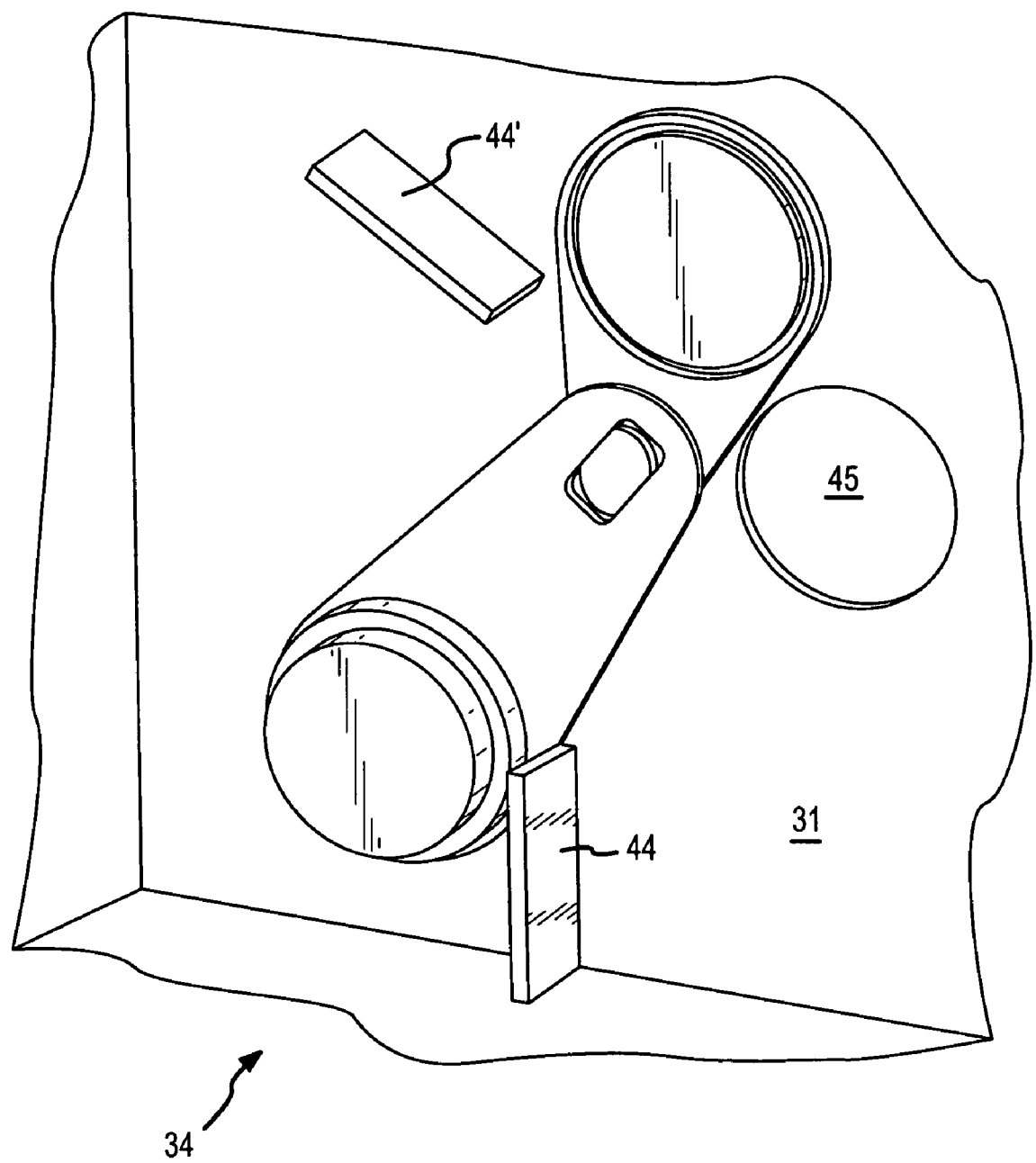
FIG. 12*b* is a perspective view of the flow bypass valve in the open position.

Referring in combination to FIGS. 12a and 12b, perspective views of bypass valve 34 in the closed and open positions are shown respectively. When the water level in pump chamber 30 is sufficiently high, valve 34 floats to the upper position and is stopped by stop 44' affixed to partitioning wall 31. At this point valve 34 blocks the flow of water through opening 45 defined in wall 31. Should the water level in pump chamber 30 drop, valve 34 drops, until stopped by stop 44 affixed to partitioning wall 31, and unblocks opening 45 defined in wall 31 thereby allowing the flow of water from skimmer chamber 24 into pump chamber 30.

Figure 13A:
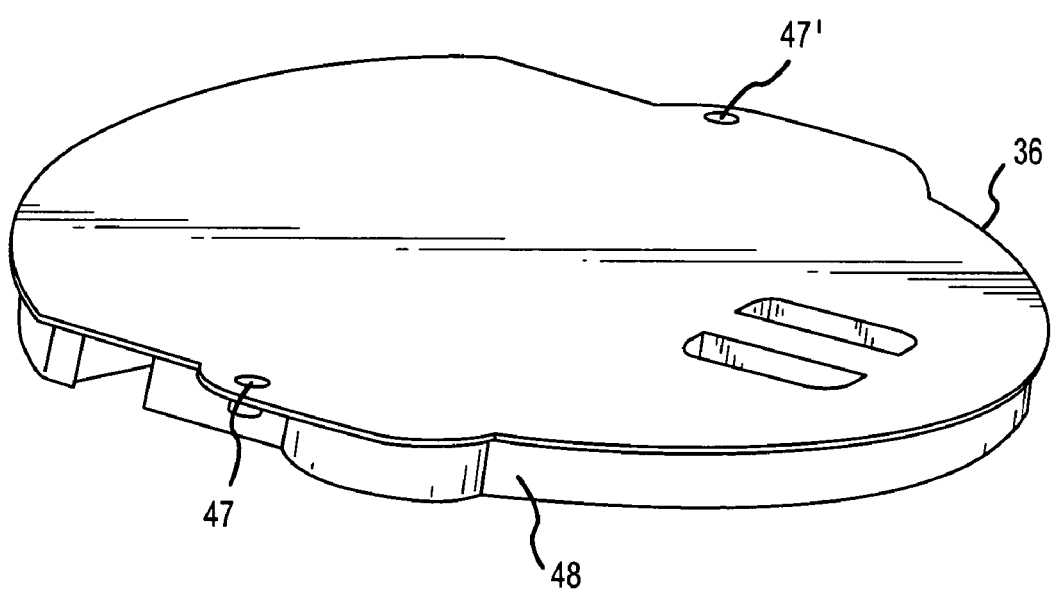
FIG. 13*a* is a perspective view of the interlocking lid of the skimmer and filter.
Figure 13B:
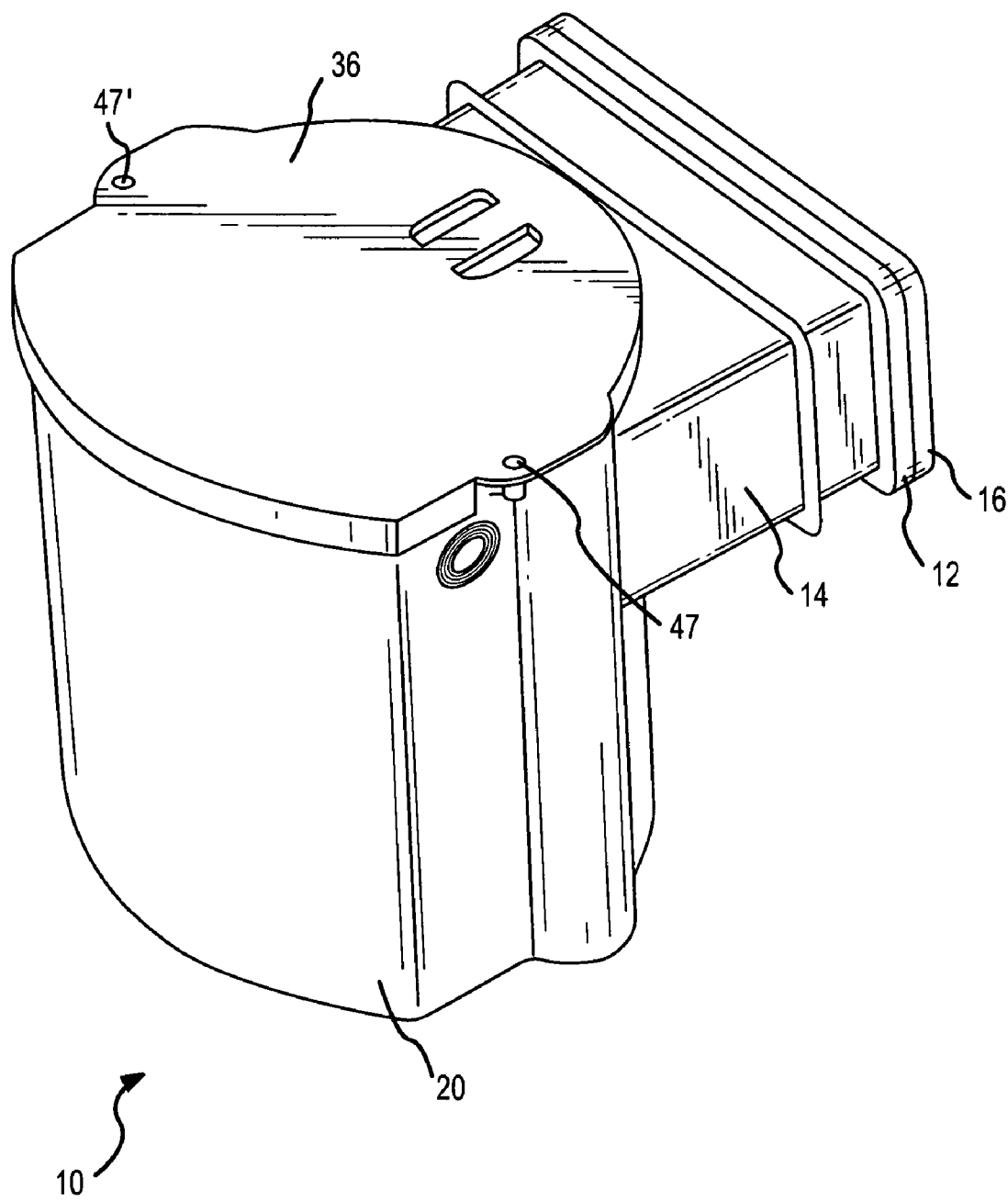
FIG. 13*b* is a perspective view of the tank and interlocking lid of the skimmer and filter.

Skimmer and filter unit 10 is protected from the environment by tank 20 and interlocking lid 36. Turning to FIGS. 13a and 13b, interlocking lid 36 and interlocking lid 36 affixed to tank 20 of skimmer and filter unit 10 are shown respectively. Lid 36 interlocks to tank 20 by stabilizing flange 48, which extends around the periphery and orthogonally downward from the bottom planar surface of lid 36, mirrors the shape of, and mates with the interior upper surface of tank 20 (see also FIG. 8). Fastening means 46, such as but not limited to screws or nuts and bolts, are positioned through mating openings 47 defined in lid 36 and tank 20 to secure lid 36 to tank 20. Interlocking lid 36 having stabilizing flange 48 prevents deformation of skimmer and filter unit 10 particularly when installed in subterranean environments. The exterior surface of lid 36 is coarse for increased frictional contact with external surroundings.

Figure 14:
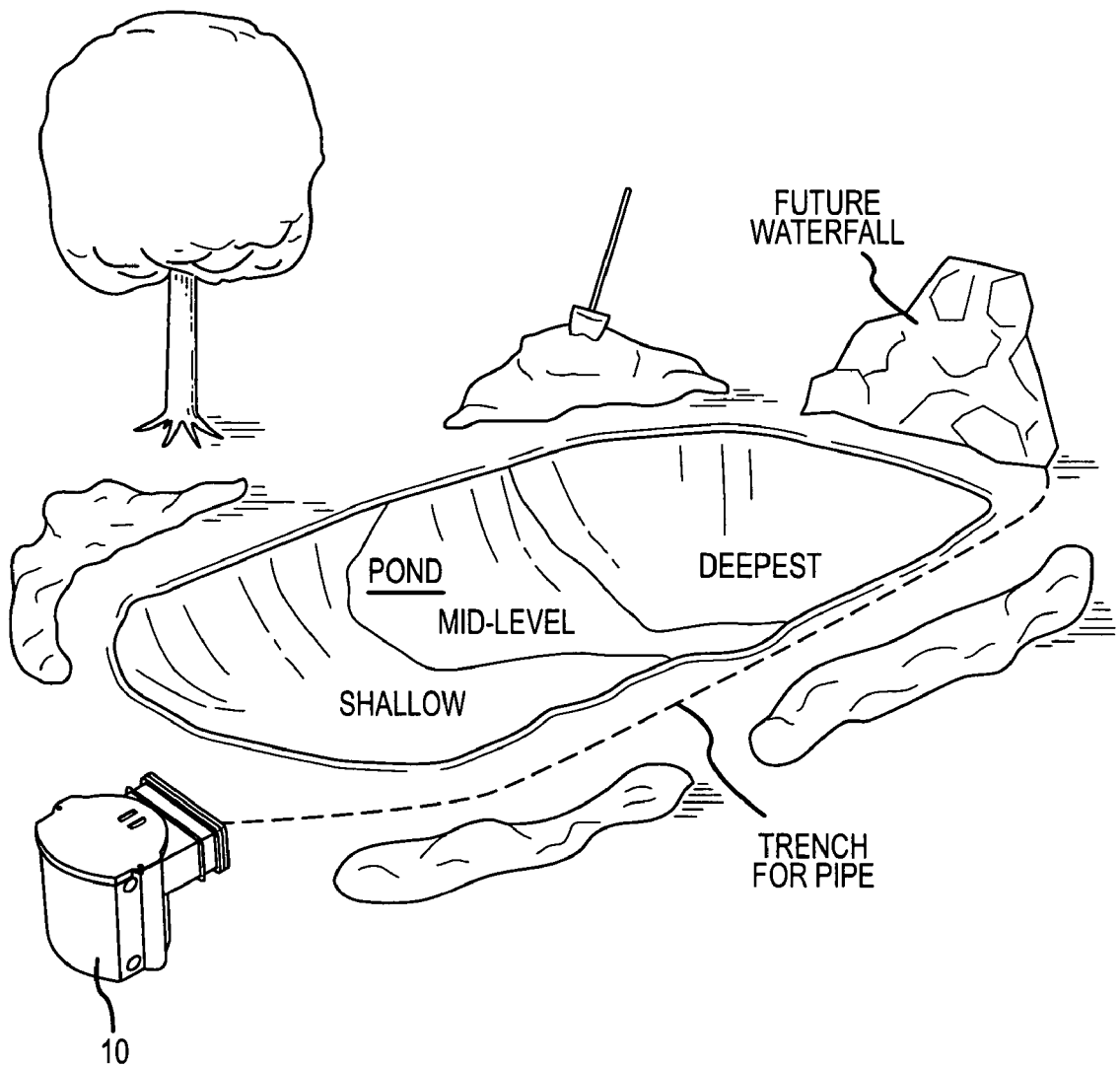
FIG. 14 is a perspective view of a landscape application for the skimmer and filter.

Turning to FIG. 14, a perspective view of a landscape application for skimmer and filter unit 10 is shown. If the landscape application includes waterfall, skimmer and filter unit 10 is positioned opposite the waterfall at an end of a body of water for improved skimming and filtering operation. Preferably skimmer and filter unit 10 is positioned below ground level approximately six inches away from the coping shelf.

Figure 15A:
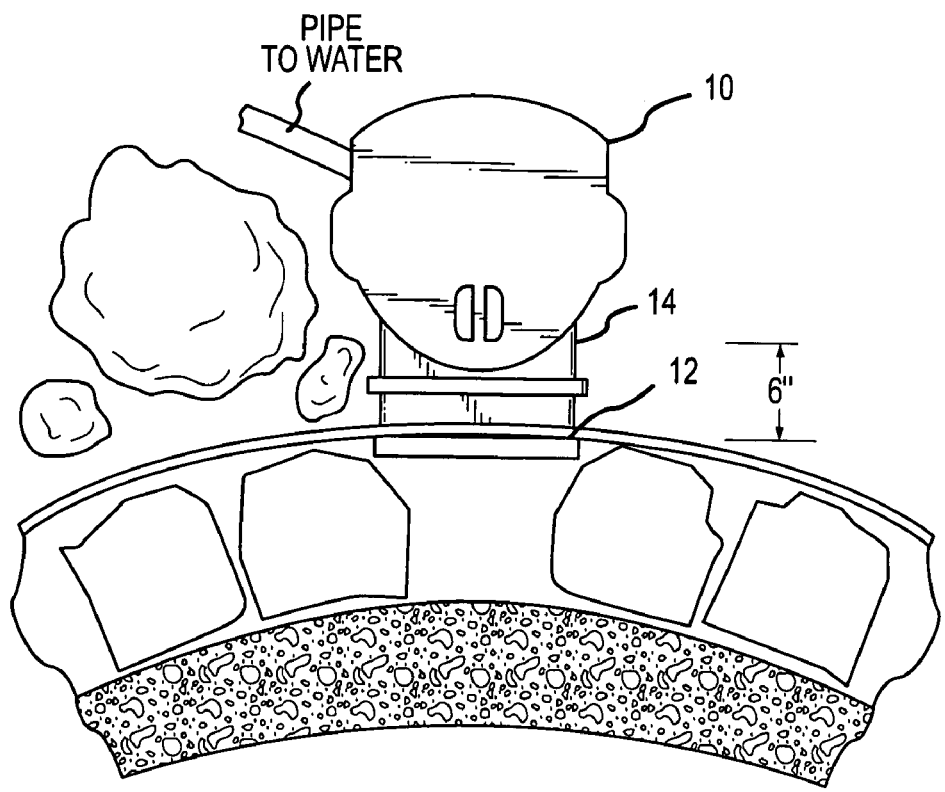
FIG. 15*a* is a top view of the landscape application for skimmer and filter unit of FIG. 14.
Figure 15B:
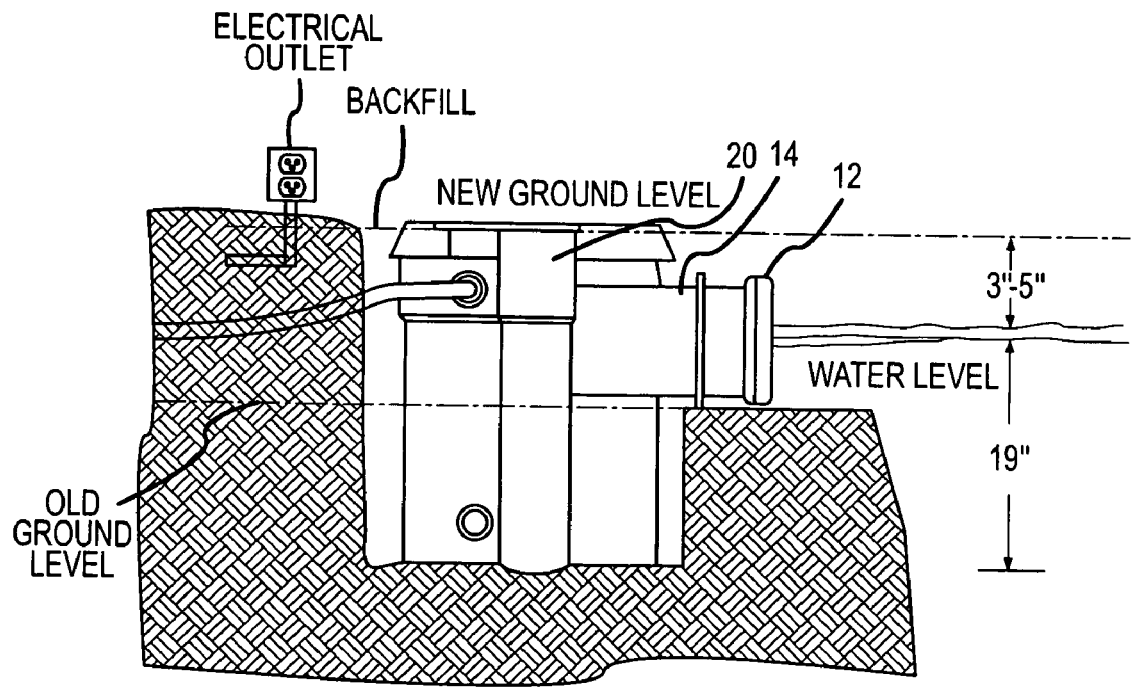
FIG. 15*b* is a side view of FIG. 15*a*.

FIG. 15a provides a top view of the landscape application for skimmer and filter unit 10 and FIG. 15b provides a side view for the landscape application of FIG. 14. Preferably skimmer and filter unit 10 is positioned so that the bottom surface of tank 20 is approximately nineteen inches below the intended water level and the bottom surface of neck 14 is approximately seven inches below the intended water level, leaving approximately three to five inches between the water level and the ground level surface created by backfilling around skimmer and filter unit 10.

Figure 16:
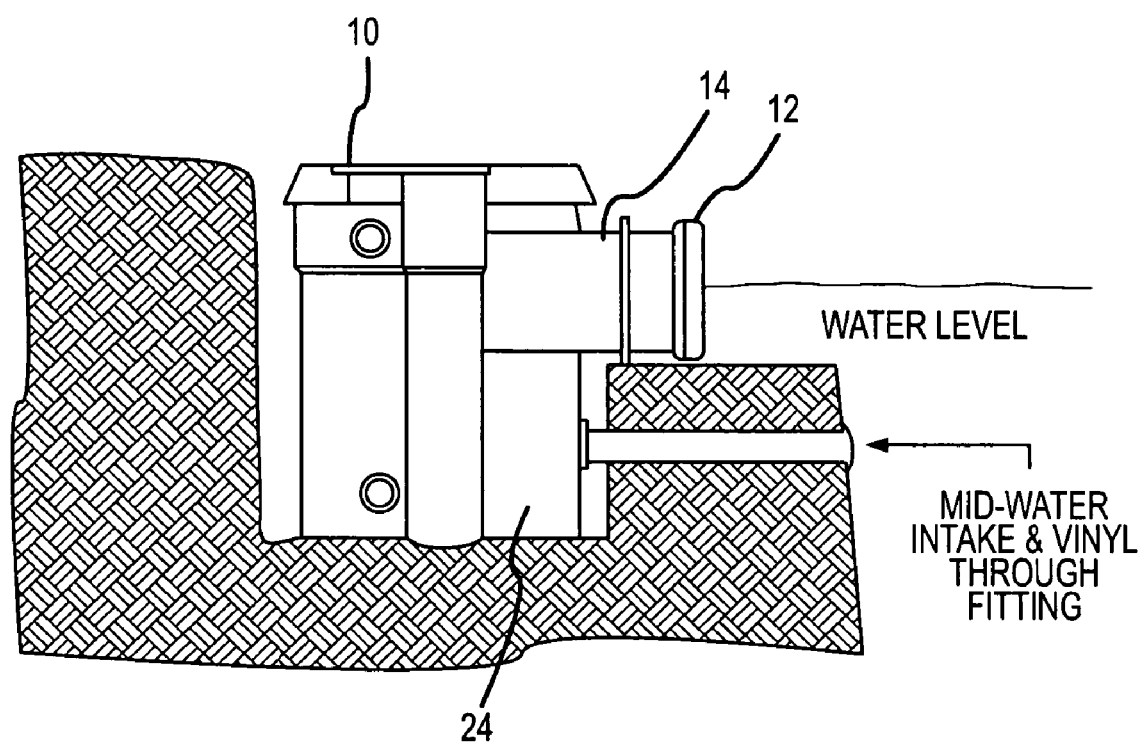
FIG. 16 is a side view of a mid-water intake feature of the skimmer and filter.

Referring to FIG. 16, a side view of an optional mid-water intake to skimmer and filter unit 10 is shown. A mid-water intake aids in preventing wear on the pump if the water level falls below the level of the weir of skimmer faceplate assembly 12. Further, in cold-weather applications when ice forms at the water surface, weir door 18 (see FIGS. 8 and 9) can be closed via locking tab 22 and water can be drawn from beneath the surface of the ice through the mid-water intake directly into skimmer chamber 24.

Although the skimmer and filter has been described in detail with reference to these embodiments, other embodiments can achieve the same results. Variations and modifications of the skimmer and filter will be obvious to those skilled in the art and the appended claims are intended to cover all such modifications and equivalents.

What is claimed is:

1. A skimmer and filter unit for use with a body of water, comprising:
    a tank portion comprising an upright approximately cylindrical tank, said tank portion for receiving water from a body of water;
    a neck extending from said tank, said neck comprising a weir faceplate assembly;
    a skimmer chamber within said tank portion; and
    an ultraviolet light chamber within said tank portion.

2. The skimmer and filter unit of claim 1 further comprising a pump chamber within said tank portion.

3. The skimmer and filter unit of claim 2 further comprising a bypass valve positioned between said pump chamber and said skimmer chamber.

4. The skimmer and filter unit of claim 1 further comprising a filter chamber within said tank portion.

5. The skimmer and filter unit of claim 4 wherein said ultraviolet light chamber is in fluid communication with said filter chamber.

6. The skimmer and filter unit of claim 4 further comprising a pump chamber, said pump chamber in fluid communication with said filter chamber.

7. The skimmer and filter unit of claim 1 wherein said weir faceplate assembly comprises:
   an interchangeable weir faceplate defining a weir opening;
   a pivoting weir door;
   a weir divider slidable into mating slots of said neck to form a fluid conduit that coincides with the dimensions of said weir opening.

8. The skimmer and filter unit of claim 1 wherein said weir faceplate assembly comprises a locking tab for securing a weir door in a closed position.

9. The skimmer and filter unit of claim 1 further comprising an interlocking lid mating to said tank portion for reducing deformation of said tank portion by an environment.

10. The skimmer and filter unit of claim 9 wherein said lid comprises a coarse exterior surface for increased frictional contact with external surroundings.

11. The skimmer and filter unit of claim 1 wherein said ultraviolet light chamber comprises an interior and an exterior defined by said tank portion, said interior for containing an ultraviolet light, said exterior for receiving a mount, said mount comprising mating slots for receiving a locking ring affixed to said ultraviolet light.

12. The skimmer and filter unit of claim 1 wherein said ultraviolet light chamber is in fluid communication with said skimmer chamber.

13. A method of treating water from a body of water, the method of comprising the steps of:
   receiving water through a weir opening in a tank;
   skimming water received through the weir opening;
   subjecting the received water to ultraviolet light within the same tank;
   sensing the water level in a pump chamber; and
   operating a bypass valve between the pump chamber and a skimmer chamber based upon a sensed water level.

14. The method of claim 13 further comprising the step of directing the water through a filter chamber.

15. The method of claim 13 further comprising the step of directing the water from a skimming chamber downward and toward an ultraviolet light chamber.

16. A method of treating water from a body of water, the method comprising the steps of:
   receiving water through a weir opening located at an upper portion of an upright tank;
   skimming water with a skimmer basket located downstream and approximately beneath the weir opening;
   directing skimmed water through a unidirectional port defined in a lower portion of a partitioning wall of the upright tank to an ultraviolet light chamber within the same tank.

17. A skimmer and filter unit for use with a body of water, comprising:
   a tank portion receiving water from a body of water;
   a skimmer chamber within said tank portion; and
   an ultraviolet light chamber within said same tank portion; and
   wherein said ultraviolet light chamber comprises an interior and exterior defined by said tank portion, said interior for containing an ultraviolet light, said exterior for receiving a mount, said mount comprising mating slots for receiving a locking ring affixed to said ultraviolet light.

18. The skimmer and filter unit of claim 17 further comprising a pump chamber within said tank.

19. The skimmer and filter unit of claim 18 further comprising a bypass valve positioned between said pump chamber and said skimmer chamber.

20. The skimmer and filter unit of claim 17 further comprising a filter chamber within said tank portion.

21. The skimmer and filter unit of claim 20 wherein said ultraviolet light chamber is in fluid communication with said filter chamber.

22. The skimmer and filter unit of claim 20 further comprising a pump chamber, said pump chamber in fluid communication with said filter chamber.

23. The skimmer and filter unit of claim 17 wherein said tank portion comprises:
   an upright approximately cylindrical tank; and
   a neck extending from said tank, said neck comprising a weir faceplate assembly.

24. The skimmer and filter unit of claim 23 wherein said weir faceplate assembly comprises:
   an interchangeable weir faceplate defining a weir opening;
   a pivoting weir door
   a weir divider slidable into mating slots of said neck to form a fluid conduit that coincides with the dimensions of said weir opening.

25. The skimmer and filter unit of claim 23 wherein said weir faceplate assembly comprises a locking tab for securing a weir door in a closed position.

26. The skimmer and filter unit of claim 17 further comprising an interlocking lid mating to said tank portion for reducing deformation of said tank portion by an environment.

27. The skimmer and filter unit of claim 26 wherein said lid comprises a coarse exterior surface for increased frictional contact with external surroundings.

28. The skimmer and filter unit of claim 17 wherein said ultraviolet light chamber is in fluid communication with said skimmer chamber.

* * * * *